United States Patent
Thubert et al.

(10) Patent No.: US 7,593,377 B2
(45) Date of Patent: Sep. 22, 2009

(54) ROUTE OPTIMIZATION FOR A MOBILE IP NETWORK NODE IN A MOBILE AD HOC NETWORK

(75) Inventors: Pascal Thubert, La Colle sur Loup (FR); Vincent Jean Ribiere, Biot (FR); Patrick Wetterwald, Mouans Sartoux (FR)

(73) Assignee: Cisco Technology, Inc., San Jose, CA (US)

( * ) Notice: Subject to any disclaimer, the term of this patent is extended or adjusted under 35 U.S.C. 154(b) by 566 days.

(21) Appl. No.: 11/391,361

(22) Filed: Mar. 29, 2006

(65) Prior Publication Data

US 2007/0230410 A1 Oct. 4, 2007

(51) Int. Cl.
*H04L 12/28* (2006.01)
*H04J 3/14* (2006.01)
*G08C 15/00* (2006.01)
*G06F 11/00* (2006.01)
*G01R 31/08* (2006.01)

(52) U.S. Cl. .................. 370/338; 370/238; 370/256; 370/349; 370/392

(58) Field of Classification Search ......... 370/254–256, 370/310–338, 351–392, 401–409; 709/238–242; 713/158
See application file for complete search history.

(56) References Cited

U.S. PATENT DOCUMENTS

| | | | |
|---|---|---|---|
| 6,850,532 B2 | 2/2005 | Thubert et al. | |
| 7,039,035 B2 * | 5/2006 | Droms et al. | 370/338 |
| 7,366,111 B2 * | 4/2008 | Thubert et al. | 370/254 |
| 7,428,221 B2 * | 9/2008 | Thubert et al. | 370/255 |
| 2004/0032852 A1 | 2/2004 | Thubert et al. | |
| 2004/0057440 A1 | 3/2004 | Thubert et al. | |
| 2004/0117339 A1 | 6/2004 | Thubert et al. | |
| 2004/0202183 A1 | 10/2004 | Thubert et al. | |
| 2004/0228343 A1 | 11/2004 | Molteni et al. | |
| 2005/0099971 A1 | 5/2005 | Droms et al. | |
| 2005/0265259 A1 | 12/2005 | Thubert et al. | |
| 2006/0007865 A1 * | 1/2006 | White et al. | 370/238 |

(Continued)

OTHER PUBLICATIONS

Gundavelli et al., "Localized Mobility Management using Proxy Mobile IPv6", NETLMM BOF, Internet draft, <draft-gundavelli-netlmm-mip6-proxy-00.txt> Nov. 5, 2005.

(Continued)

*Primary Examiner*—M. Phan
(74) *Attorney, Agent, or Firm*—Leon R. Turkevich (57) ABSTRACT

A clusterhead of a tree-based, mobile ad hoc network includes a mobile IP proxy resource for registering a received binding update request from a mobile ad hoc router within the network, creating a first mobile IP tunnel with the mobile ad hoc router, sending a second binding update request to a remote home agent of the mobile ad hoc router, and initiating a second mobile IP tunnel between the clusterhead and the home agent. If a packet received from the mobile ad hoc router specifies a destination determined as reachable within the mobile ad hoc network, use of the second mobile IP tunnel is minimized by outputting the packet toward the destination according to the mobile ad hoc routing protocol. If the packet is not reachable within the mobile ad hoc network, the packet is forwarded via the second mobile IP tunnel to ensure packet transmission is topologically correct.

30 Claims, 5 Drawing Sheets

U.S. PATENT DOCUMENTS

| | | | |
|---|---|---|---|
| 2006/0291404 A1* | 12/2006 | Thubert et al. | 370/254 |
| 2007/0113075 A1* | 5/2007 | Jo et al. | 713/158 |
| 2007/0153707 A1* | 7/2007 | Thubert et al. | 370/254 |
| 2008/0170513 A1* | 7/2008 | Niranjan et al. | 370/256 |
| 2008/0212494 A1* | 9/2008 | Thubert et al. | 370/254 |
| 2008/0219237 A1* | 9/2008 | Thubert et al. | 370/349 |

OTHER PUBLICATIONS

Ng et al., "Network Mobility Route Optimization Problem Statement", NEMO Working Group, Internet Draft, <draft-ietf-nemo-ro-problem-statement-00> Jul. 4, 2005.

Ng et al., "Network Mobility Route Optimization Problem Statement", NEMO Working Group, Internet Draft, <draft-ietf-nemo-ro-problem-statement-01> Oct. 11, 2005.

Ng et al., "Network Mobility Route Optimization Solution Space Analysis", NEMO Working Group, Internet Draft, <draft-ietf-nemo-ro-space-analysis-00> Aug. 31, 2005.

Ng et al., "Network Mobility Route Optimization Solution Space Analysis", NEMO Working Group, Internet Draft, <draft-ietf-nemo-ro-space-analysis-01> Oct. 24, 2005.

Thubert et al., "Global HA to HA protocol", Network Mobility, Internet Draft, <draft-thubert-nemo-global-haha-00> Oct. 5, 2004.

Thubert et al., "Global HA to HA protocol", Network Mobility, Internet Draft, <draft-thubert-nemo-global-haha-01> Oct. 15, 2005.

Clausen et al., "Optimized Link State Routing Protocol (OLSR)", Network Working Group, Request for Comments: 3626, Oct. 2003.

Johnson et al., "Mobility Support in IPv6", Network Working Group, Request for Comments: 3775, Jun. 2004.

Devarapalli et al., "Network Mobility (NEMO) Basic Support Protocol", Network Working Group, Request for Comments: 3963, Jan. 2005.

* cited by examiner

ROUTE OPTIMIZATION FOR A MOBILE IP NETWORK NODE IN A MOBILE AD HOC NETWORK

BACKGROUND OF THE INVENTION

1. Field of the Invention

The present invention relates to optimizing use of mobile IP protocols ("Mobile IP") by a mobile network node that is attached to a mobile ad hoc network (MANET).

2. Description of the Related Art

Mobile computing has evolved to an extent that it is no longer limited to a mobile computing model (e.g., "Mobile IP") that relies a fixed wide area network infrastructure such as the Internet to provide connectivity between a mobile node and a correspondent node; rather, an ad hoc networking model has been pursued that enables an isolated group of mobile nodes to independently establish communications among each other (e.g., a "mesh") and establish optimized routing paths among each other.

In particular, the aforementioned Mobile IP model has been developed based on implementing numerous Mobile IP protocols according to proposals by Internet Engineering Task Force (IETF) groups: these IETF proposals (e.g., Requests for Comments (RFCs), Internet Drafts, etc.) have addressed improved mobility support of Internet Protocol (IP) based mobile devices (e.g., laptops, IP phones, personal digital assistants, etc.) in an effort to provide continuous Internet Protocol (IP) based connectivity for IP devices to a fixed wide area network such as the Internet. These IETF proposals have described the Mobile IP model as relying on an IP node (IPv4 or IPv6) having a home address that is registered with a home agent at its home network: the home agent and home network are assumed to be fixed within the Internet architecture, enabling the home address to be globally reachable by any Internet node via the fixed home network and home agent. In other words, an underlying requirement of the Internet architecture is that the home address assigned to the IP node is topologically correct, i.e., the home address is within the address realm of the fixed home network (i.e., the home address is within the address prefix assigned to the fixed home network), such that the home address is globally reachable via the home agent within the fixed home network.

If the IP node in the Mobile IP model is roaming away from its home network and establishes communications in a visited IP network, the visited IP network assigns a care-of address to the IP node: the care-of address is globally reachable in the Internet via a fixed gateway at the edge of the visited IP network (also referred to herein as a "visited gateway"). Since the visited gateway provides a fixed presence on the Internet for the visited IP network, registration by an IP node with its home agent (by specifying that the roaming IP node is reachable via the care-of address assigned by the visited IP network) enables the home agent to use the care-of address to tunnel packets destined for the home address to the IP node, via a tunnel between the home agent and the visited gateway. Alternately, the tunnel can be extended to the router nearest the roaming IP node based on the roaming IP node employing a reverse routing header as described in U.S. Patent Publication No. US 2004/0117339, published Jun. 17, 2004, the disclosure of which is incorporated in its entirety herein by reference.

Hence, an IPv4 or IPv6 node (host or router) in the Mobile IP model can seamlessly "roam" among different mobile IP networks, based on relying upon the home agent and visited gateway having a fixed presence on the Internet. Since the Internet utilizes a hierarchy of aggregate network addresses that enables scalability, the reliance of a fixed presence for the home agent and the visited gateway in the Internet enables similar optimization techniques to be applied in mobile IP networks relying on a fixed gateway, for example aggregation of network addresses and network prefixes based on a hierarchal network model. See, for example, U.S. Patent Publication No. US 2005/0099971, published May 12, 2005, the disclosure of which is incorporated in its entirety herein by reference.

The reliance of a fixed presence for the home agent and the visited gateway also enables route optimization between a roaming mobile router and a correspondent node (or correspondent router), the correspondent node/router serving as a destination for traffic from the roaming mobile router. Examples of route optimization between a roaming mobile router and a correspondent node/router are disclosed, for example in U.S. Patent Publication No. US 2004/0202183, published Oct. 14, 2004, and U.S. Patent Publication No. US 2004/0228343, published Nov. 18, 2004, the disclosures of which are incorporated in their entirety herein by reference.

Additional proposals to improve the Mobile IP model have involved use of a home agent, for example as described in RFC 3775 for Mobile IPv6 (MIP6), and RFC 3963 for Mobile IPv4 (NEMO). In addition, the Internet Draft by Thubert et al., "Global HA to HA protocol", draft-thubert-nemo-global-haha-01, Oct. 15, 2005, describes a Mobile IP (MIP) proxy for local mobility management and route optimization in the Internet.

In particular, the Internet Draft "Global HA to HA protocol" describes a mobile router that performs a "proxy binding" (i.e., "local binding") with a MIP proxy that is closer (topologically or geographically) than the assigned home agent to the mobile router: the MIP proxy serves as a "proxy home agent" for the mobile router, and as a "proxy mobile router" for the assigned home agent. In particular, the MIP proxy terminates the mobile router-to-home agent tunnel initiated by the mobile router ("MR-HA tunnel"), decrypts and decapsulates the packets received from the mobile router via the MR-HA tunnel, and re-encapsulates the packets for transmission to the destination (e.g., the Home Agent) via a second tunnel ("proxy-to-home agent tunnel"). Hence, the mobile router performs a binding update with the MIP proxy (specifying the mobile router home address is reachable via a specified care-of address) and creates a mobile router-to-proxy tunnel terminated by the MIP proxy, and the MIP proxy performs a "primary binding" with the assigned home agent (specifying the mobile router home address is reachable via the MIP proxy) and creates the proxy-to-home agent tunnel. The Internet Draft "Global HA to HA protocol" distinguishes the MIP proxy from a "proxy-MIP" function, which performs Mobile IP mobile node operations on behalf of a non MIP-enabled mobile node, enabling the transparent management of the non MIP-enabled mobile node.

Hence, the Internet Draft "Global HA to HA protocol" enables deployment of a partitioned home network based on distribution of MIP proxy devices throughout a wide area network (e.g., the Internet): the distributed MIP proxy devices enable both the mobile router and correspondent nodes to communicate via the nearest MIP proxy devices, and improves communications for IP based services such as Voice over IP. The distributed MIP proxies also provide advantages such as route optimization between MIP proxies, local mobility management as a mobile router moves around a given MIP proxy, and terminating nested tunnels formed by multiple mobile routers having attached to each other.

Hence, the above-described Mobile IP protocols enable route optimization, local mobility management, and nesting of mobile networks, but at the expense of substantial overhead due to packet encapsulation and sending packet traffic via directed tunnels.

Unlike the above-described Mobile IP model that relies on device address assignment according to network topology, the ad hoc networking model assumes no previous existing network topology: Internet connectivity is neither assumed nor precluded, and every network node is assumed to be mobile. Consequently, the ad hoc networking model assumes no more than a group of mobile nodes (hosts and routers) may arbitrarily connect to each other via available link layer ("Layer 2") connections, resulting in a mesh network. Hence, the ad hoc networking model addresses routing protocols that enable the ad hoc network nodes to create optimized network layer paths to each other, using for example a directed acyclic graph-based path or a tree topology-based path.

The IETF has a Mobile Ad-hoc Networks (MANET) Working Group that is working to implement this ad hoc networking model by developing standardized MANET routing specification(s) for adoption by the IETF. According to the MANET Working Group, the "mobile ad hoc network" (MANET) is an autonomous system of mobile routers (and associated hosts) connected by wireless links—the union of which form an arbitrary graph. The routers and hosts are free to move randomly and organize themselves arbitrarily; thus, the network's wireless topology may change rapidly and unpredictably. Such a network may operate in a standalone fashion, or may be connected to the larger Internet.

The MANET system is particularly suited to low-power radio networks that may exhibit an unstable topology, where wireless propagation characteristics and signal quality between a wireless transmission source and a receiver can be difficult to model and quantify. Since there is no fixed network infrastructure in a MANET, the device address is tied to the device, not a topological location. As described in an Internet Draft by Baker, entitled "An Outsider's View of MANET" (Mar. 17, 2002), the fundamental behavior of a MANET is that a mobile router in a MANET retains a unique address prefix that may be distinct from the address prefixes of neighboring mobile routers; in other words, neighboring mobile routers in a MANET may have distinct address prefixes. Consequently, if a mobile router in a MANET moves, the movement causes a change in the routing infrastructure that requires recalculation of routes in accordance with the new topology. Hence, efficient routing algorithms are needed to ensure rapid convergence of the new topology based on the recalculated routes. One exemplary routing protocol is Optimized Link State Routing (OLSR) Protocol (as specified by the IETF Request for Comments (RFC) 3626).

Communications between mobile routers of an ad hoc network can be optimized based on the mobile routes organizing into a tree-based topology. For example, U.S. Patent Publication No. US 2004/0032852, published Feb. 19, 2004, entitled "Arrangement for Router Attachments Between Roaming Mobile Routers in a Mobile Network", the disclosure of which is incorporated in its entirety herein by reference, describes a technique for each mobile router of an mobile ad hoc network to independently select whether to attach to a candidate attachment router, based on tree information options advertised by the candidate attachment router and selection criteria employed by the mobile router. Hence, the routers can dynamically establish a tree-based network topology model, where each router may continually determine whether an alternate attachment point within the tree is preferred.

Once a tree-based topology has been established within the ad hoc network, routing information can be distributed in an efficient manner. For example, U.S. Patent Publication No. US 2005/0265259, published Dec. 1, 2005 entitled "Arrangement for Providing Network Prefix Information from Attached Mobile Routers to a Clusterhead in a Tree-Based Ad Hoc Mobile Network", the disclosure of which is incorporated in its entirety herein by reference, describes optimized transfer of routing information between mobile routers in an ad hoc mobile network having a tree topology, wherein the ad hoc network includes a single clusterhead and attached mobile routers. Each attached mobile router has a default egress interface configured for sending messages toward the clusterhead, and ingress interfaces configured for receiving messages from attached network nodes that are away from the clusterhead. A neighbor advertisement message received from an ingress interface away from a clusterhead is used by the attached mobile router to identify specified network prefixes that are reachable via the source of the neighbor advertisement message. The attached mobile router outputs on its default upstream interface a second neighbor advertisement message that specifies the network prefix used by the attached mobile router, and the specified network prefixes from the neighbor advertisement message received on the ingress interface. Hence, the propagation of neighbor advertisement messages toward the clusterhead establishes connectivity with minimal routing overhead.

The clusterhead of a mobile ad hoc network also can be configured as a Proxy MIP that performs Mobile IP operations on behalf of ad hoc network nodes that lack Mobile IP functionality. For example, U.S. Patent Publication No. 2004/0057440, published Mar. 25, 2004, entitled "Arrangement in a Gateway for Registering Mobile Routers of a Mobile Ad Hoc Network to Respective Home Agents", the disclosure of which is incorporated in its entirety herein by reference, describes a gateway of a MANET that is configured for identifying mobile routers in the MANET using a prescribed proactive MANET routing protocol, locating for each identified mobile router its corresponding home agent, and registering the corresponding identified mobile router with the corresponding home agent according to the prescribed mobile IP protocol.

Hence, the ad hoc networking model provides rapid convergence between ad hoc nodes having respective device network addresses assigned independent of any network topology.

Unfortunately, attempts to add the above-described features of Mobile IP protocols to a MANET network coupled to the Internet, especially a MANET having established a tree-based topology and routing information based on the neighbor advertisement messages described in the above-incorporated U.S. Patent Publication No. US 2005/0265259, may result in substantially reduced efficiency in the MANET network, to an extent that may prevent convergence of the MANET network due to any topology changes.

For example, a mobile router in MANET having a tree-based topology will send packets to its default route (namely, its attachment router) via its egress interface for any destination prefix that is not identified in the mobile router's routing table, however a destination prefix identified in that routing table will be output on an ingress interface of the mobile router. However, use of Mobile IP protocols in a MANET network, such as the Internet Draft "Global HA to HA protocol", could invariably assumes that a source mobile node generates a mobile node-to-proxy tunnel to the MIP proxy for transport of encapsulated packets: the encapsulated packets increase the packet size (and hence network traffic), and if the MANET clusterhead was implemented to function as a MIP proxy, the required use of tunnels would force all network traffic to the clusterhead and the home agent of the source mobile node, regardless of the location of the destination node. In particular, configuring the gateway as a MIP proxy would require the gateway to re-encapsulate the received packet from the mobile node-to-proxy tunnel and forward the reencapsulated packet to the home agent via a corresponding proxy-to-home agent tunnel. Hence, a packet from a source MANET node to a destination MANET node would need to be: tunneled from a source MANET node to the clusterhead, to the home agent; tunneled from the clusterhead to the home agent of the source MANET node; tunneled from the home agent of the destination MANET node to the clusterhead; and tunneled from the clusterhead to the destination MANET node. Note that even if a home agent (e.g., a home agent for a source node or a destination node) could be replaced by a proxy agent, or if the clusterhead could serve as the MIP proxy for both the source MANET node and the destination MANET node, the clusterhead still would need to receive the packet from the source MANET node via the corresponding tunnel and send the packet to the destination MANET node via the corresponding tunnel, even if the destination MANET node is reachable via an intermediate mobile router before the clusterhead.

Consequently, a MANET network having established a tree-based topology and configured for sending advertisement message as described in the above-incorporated U.S. Patent Publication No. US 2005/0265259 would suffer a substantial degradation in performance, because all packets would be destined to the clusterhead and from the clusterhead, even if the packet only needs to traverse one or two hops in the MANET to reach the destination.

SUMMARY OF THE INVENTION

There is a need for an arrangement that enables mobile ad hoc routers in a mobile ad hoc network having a tree topology to utilize Mobile IP protocols without adversely affecting network convergence ability or communications efficiency in the mobile ad hoc network.

There also is a need that enables mobile ad hoc routers in a mobile ad hoc network having a tree topology to utilize Mobile IP protocols without the necessity of tunnels within the mobile ad hoc network.

These and other needs are attained by the present invention, where a clusterhead of a tree-based, mobile ad hoc network includes a mobile IP proxy resource for registering a received binding update request from a mobile ad hoc router within the network, creating a first mobile IP tunnel with the mobile ad hoc router, sending a second binding update request to a remote home agent of the mobile ad hoc router, and initiating a second mobile IP tunnel between the clusterhead and the home agent. If a packet received from the mobile ad hoc router specifies a destination determined as reachable within the mobile ad hoc network, use of the second mobile IP tunnel is minimized by outputting the packet toward the destination according to the mobile ad hoc routing protocol. If the packet is not reachable within the mobile ad hoc network, the packet is forwarded via the second mobile IP tunnel to ensure packet transmission is topologically correct.

Hence, a clusterhead can route a received packet, regardless of whether the packet is received within the mobile ad hoc network via a mobile IP tunnel or via a mobile ad hoc network link, back into the clusterhead when appropriate and without forwarding the packet to the home agent, improving performance and minimizing overhead in transmitting the packet.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
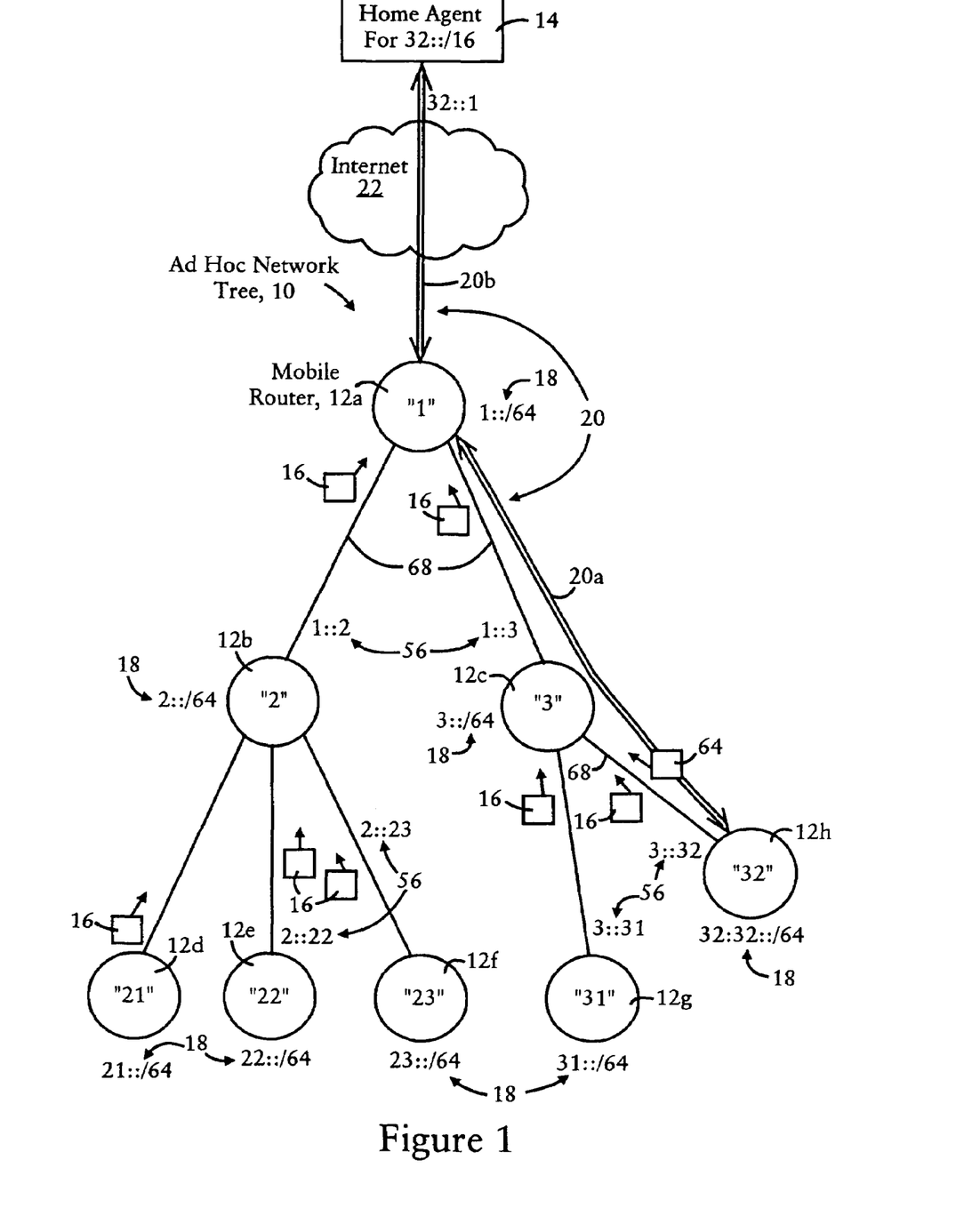
FIG. 1 is a diagram illustrating a mobile ad hoc network of mobile ad hoc routers having aggregated into a tree-based collection of aggregation groups, including a clusterhead configured for establishing a proxy to home agent tunnel with a home agent via a wide area network according to a mobile IP protocol, on behalf of an attached mobile ad hoc router, according to an embodiment of the present invention.

FIG. 1 is a diagram illustrating a mobile ad hoc network (MANET) 10 formed by mobile ad hoc routers 12 (e.g., 12a, 12b, 12c, 12d, 12e, 12f, 12g, and 12h) self-organizing into a tree-based topology having a single network clusterhead 12a, according to an embodiment of the present invention.

FIG. 1 also illustrates that the clusterhead 12a is configured to operate as a mobile IP (MIP) proxy, for example as described in the above-identified Internet Draft, "Global HA to HA protocol", enabling the clusterhead 12a to establish a mobile IP tunnel 20 between a mobile ad hoc router 12h configured for implementing a prescribed mobile IP protocol (Mobile IP), and the home agent 14 for the mobile ad hoc router 12h. As described in detail below, the clusterhead 12a is configured for implementing the mobile IP tunnel 20 by establishing a mobile router (MR) to proxy home agent (HA) tunnel 20a with the mobile ad hoc router 12h, and a proxy to home agent tunnel 20b with the home agent 14 via a wide area packet network 22, such as the Internet.

Figure 2:
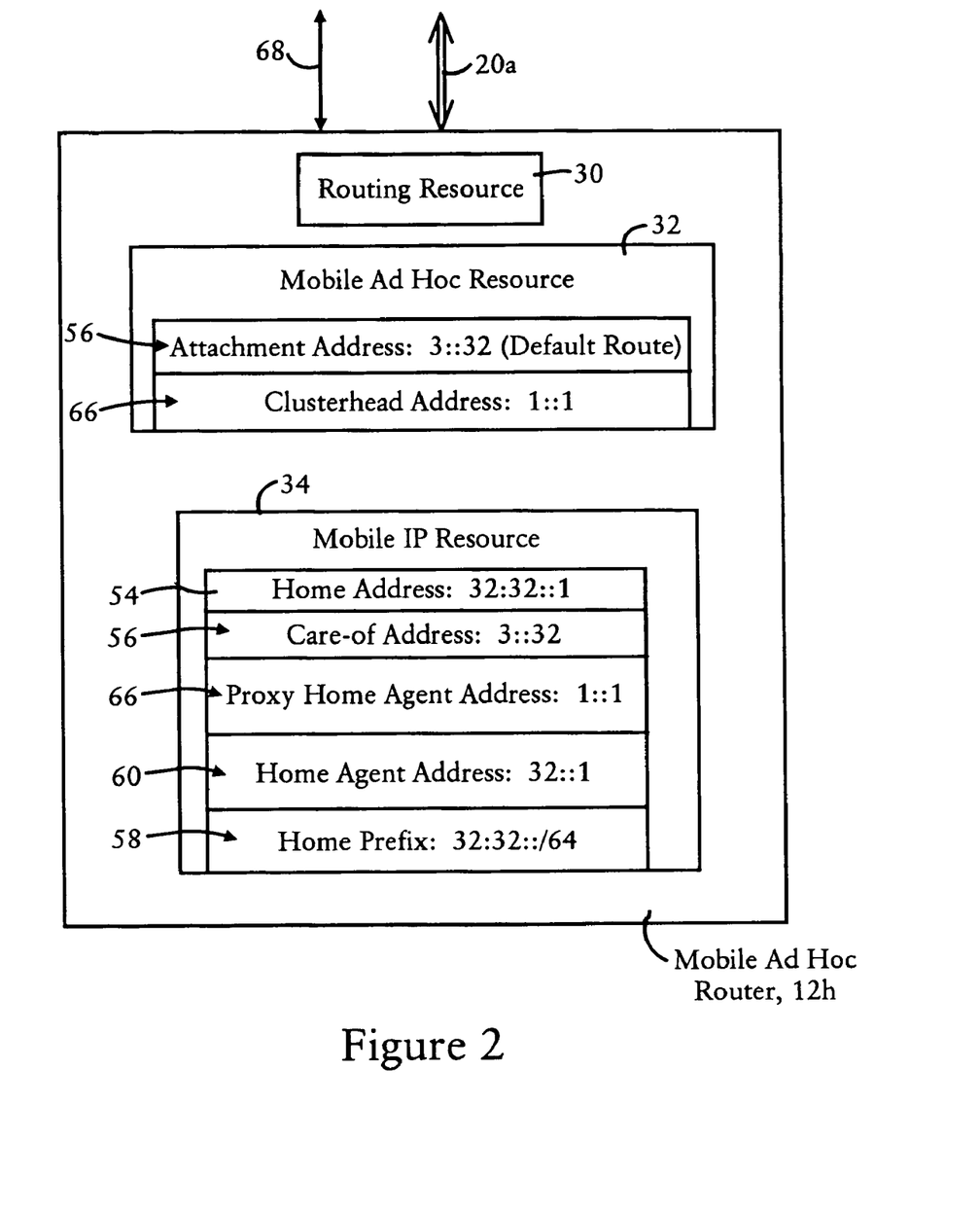
FIG. 2 is a diagram illustrating one of the mobile ad hoc routers of FIG. 1, according to an embodiment of the present invention.

FIG. 2 is a diagram illustrating one of the mobile ad hoc routers 12, for example the mobile ad hoc router 12h, according to an embodiment of the present invention. FIG. 2 illustrates the functional components of the mobile ad hoc router 12h that are utilized when attached to the mobile ad hoc network 10, although it will be appreciated that each mobile ad hoc router 12 also may include the components illustrated in FIG. 3, enabling any one of the mobile ad hoc routers 12 to operate as a clusterhead, as appropriate.

As described in further detail below with respect to FIG. 4, the mobile ad hoc router 12h includes a routing resource 30, a mobile ad hoc resource 32, and a mobile IP resource 34. The mobile ad hoc resource 32 is configured for outputting router advertisement messages and neighbor advertisement messages, described below, and attaching to an attachment router according to a MANET protocol that requires formation of a MANET according to a tree topology.

The mobile IP resource of FIG. 2 is configured for establishing connectivity with the wide area network 22 based on sending a binding update message to the clusterhead 12a, and establishing the mobile router to proxy home agent tunnel 20a with the clusterhead 12a. Hence, the mobile ad hoc router 12h can utilize mobile IP based services while the mobile ad hoc network 10 is connected to the wide area network 22.

Figure 3:
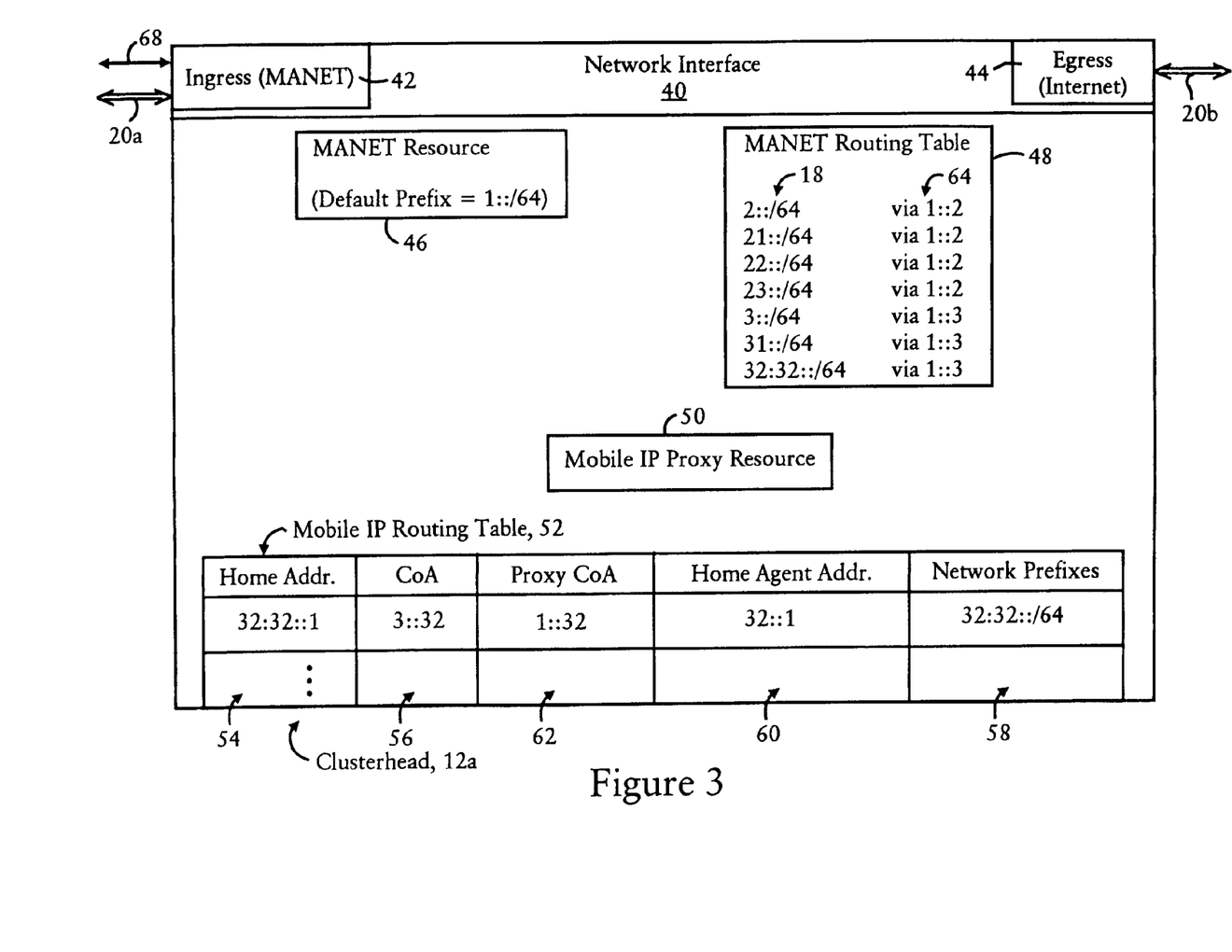
FIG. 3 is a diagram illustrating the clusterhead of FIG. 1, according to an embodiment of the present invention.

FIG. 3 is a diagram illustrating the clusterhead 12a according to an embodiment of the present invention. As described in detail below with respect to FIG. 5, the clusterhead 12a is configured for establishing the tree-based mobile ad hoc network 10, and the proxy-based mobile IP tunnels 20a and 20b to enable the mobile IP-enabled mobile ad hoc network router 12h to reach its home agent 14. In addition, the clusterhead 12a limits the transfer of packets from the mobile ad hoc router 12h to its home agent 14 to only those instances where the destination for the packet is specifically determined to be unreachable via the mobile ad hoc network 10. Hence, use of the proxy to home agent tunnel 20b is minimized.

The clusterhead 12a of FIG. 3 includes a network interface 40 having an ingress interface 42 and an egress interface 44, an executable mobile ad hoc network resource 46, a mobile ad hoc network routing table 48, an executable mobile IP proxy resource 50, and a mobile IP routing table 52. The ingress interface 42 is configured for receiving packets from attached mobile routers in the mobile ad hoc network 10, and sending packets to the attached mobile routers in the mobile ad hoc network; the egress interface 44 is configured for sending and receiving packets to and from the wide area network 22, including via the proxy to home agent tunnel 20b. The mobile ad hoc network resource 46 is configured for establishing the mobile ad hoc network 10 according to the tree topology, and adding entries to the routing table 48 in response to received neighbor advertisement messages 16, described below.

The mobile IP proxy resource 50 is configured for parsing a received binding update message, for example the binding update message received from the mobile ad hoc router 12h, and storing into the mobile IP routing table 52 the parameters specified in the binding update message, for example the home address 54, the care of address 56, and any network prefixes 58 specified in the binding update message. As described below, the mobile IP proxy resource 50 also is configured for sending a second binding update message to the identified home agent 14 at its home agent address 60, specifying that the home address 54 is reachable via the proxy care of address 62 owned by the clusterhead 12a. Hence, the home agent 14 for the mobile ad hoc router 12h can update its binding cache to specify that the home address "32:32::1" 54 used by the mobile router 12h is reachable via the proxy care of address "1::32" 62, and the clusterhead 12a and the home agent 14 can establish the proxy to home agent tunnel 20b.

The mobile ad hoc network resource 46 is configured for establishing the tree-based mobile ad hoc network 10, based on outputting router advertisement messages as described in detail in the above-incorporated Patent Publication No. US 2004/0032852, and adding entries to the routing table 48 specifying network prefixes 18 that are reachable via a next hop addresses 64, as described in detail with respect to the above-incorporated Patent Publication No. US 2005/0265259.

In particular, each mobile ad hoc router 12 is configured for advertising its presence in the ad hoc network 10 based on outputting router advertisement messages (not shown) that specify a corresponding network prefix 18 owned by the corresponding mobile ad hoc router. The MANET resource 32 of any mobile ad hoc router 12 detecting the router advertisement messages can selectively attach to the advertising mobile ad hoc router by selecting according to the MANET protocol an attachment address 56 within the address realm of the network prefix 18 of the attachment router for the attached mobile router. For example, the MANET resource 32 of the mobile ad hoc router 12h detects the mobile ad hoc router 12c advertising the network prefix "3::/64" 18, and in response selects the attachment address "3::32" 56 for attaching to the attachment router 12c.

Attachment techniques such as described in the above-incorporated U.S. Patent Publication No. US 2004/0032852 enable individual mobile routers to choose an attachment router that belongs to a tree-based ad hoc network based on advertised attributes that describe the position of the advertising attachment router relative to the physical structure of the tree. For example, U.S. Patent Publication No. US 2004/0032852 describes that an advertisement resource 46 may specify a tree information option specifying a tree identifier (e.g., an IP address 66 of the top level mobile router (TLMR) or IEEE based 64-bit extended unique identifier (EUI-64) based link local address), a tree group identifier (e.g., an IPv6 address of a mobile router attached to the TLMR), a preference field, a tree depth field, a fixed/mobile field, and a delay timer field. Hence, the tree identifier and the tree group identifier enable a mobile router to distinguish between multiple branches in the same mobile ad hoc network. Hence, the MANET resources 32 of the mobile ad hoc routers 12d, 12e and 12f attach as "attached routers" to their attachment router 12b, and the MANET resources 32 of the attached routers 12g and 12h can attach to their attachment router 12c; further, the MANET resources 32 of the mobile ad hoc routers 12b and 12c can attach as "attached routers" to the clusterhead 12a as their attachment router.

Once the attached mobile ad hoc routers (e.g., 12b, 12c, 12d, 12e, 12f, 12g, and 12h) have attached within the mobile ad hoc network 10 according to a tree-based topology, MANET resources 32 of the attached mobile ad hoc routers send neighbor advertisement messages 16 to their respective attachment routers (i.e., toward the clusterhead 12a), enabling the attachment routers (e.g., 12a, 12b, and 12e) to learn the reachable address prefixes 18 for routing packets according to the mobile ad hoc network (MANET) protocol.

In particular, each of the attached mobile routers (e.g., 12b, 12c, 12d, 12e, 12f 12g, and 12h) is configured for outputting neighbor advertisement messages 16 as described in the above-incorporated U.S. Patent Publication No. US 2005/0265259. Each neighbor advertisement message specifies network prefixes 18 that are reachable via the source of the neighbor advertisement message; hence, the MANET resource 34/46 of each attachment mobile router (e.g., 12b and 12c), in response to receiving a neighbor advertisement message from an attached mobile router, updates its MANET routing table 48 with the network prefixes 18 reachable via the stored next hop attachment address 64 of the attached mobile router (i.e., next hop router). The MANET resource 32/46 of each attachment r outer also outputs an updated neighbor advertisement message 16 that specifies the network prefix (or prefixes) 18 used by the attached mobile router, and the specified network prefixes from the neighbor advertisement message received from the attached mobile routers. For example, the mobile router 12b outputs a neighbor advertisement message 16 specifying that the prefixes "2::/64", "21::/64", "22::/64", and "23::/64" 18 are reachable via the attachment address "1::2" 56 used by the mobile router 12b, and the mobile router 12c outputs a corresponding neighbor advertisement message 16 specifying that the prefixes "3::/64", "31::/64", and "32:32::/64" 18 are reachable via the attachment address "1::3" 56 used by the mobile router 12c. Hence, the propagation of neighbor advertisement messages toward the clusterhead 12a establishes connectivity with minimal routing overhead.

Hence, the MANET resource 46 of the clusterhead 12a, in response to receiving the neighbor advertisements from the attached mobile routers 12b and 12c, updates its routing table 48 as illustrated in FIG. 3 to specify the network prefix 18 and corresponding next hop address 64 for each network prefix 18 in the mobile ad hoc network 10.

As apparent from the foregoing, while the clusterhead 12a will learn all the prefixes 18 that are reachable via the mobile ad hoc network 10 based on receiving the neighbor advertisement messages 16 from its attached mobile routers 12b and 12c, the clusterhead 12a does not propagate the prefix information in the advertisement messages 16 back down toward the attached mobile ad hoc routers 12b or 12c. Hence, the mobile routers 12c, 12g, and 12h will not be able to learn that the prefixes "2::/64", "21::/64", "22::/64" 18 are reachable in the mobile ad hoc network 10. This lack of knowledge by the mobile routers 12c, 12g, and 12h that the prefixes "2::/64", "21::/64", "22::/64" 18 are reachable in the mobile ad hoc network 10 is not a concern if the mobile routers 12c, 12g, and 12h operate only according to the MANET protocols, because the default route for unknown destinations is toward the clusterhead 12a, which can route the packet.

However, if the mobile ad hoc router 12h and the clusterhead 12a are configured for also implementing a mobile IP protocol, where the mobile ad hoc router 12h registers with the mobile router 12a advertising as a proxy home agent on behalf of the home agent 14, then registration with the clusterhead 12a may cause the mobile ad hoc router 12h to output a packet destined for the mobile ad hoc router 12b to its home agent 14 via a mobile IP tunnel 20.

According to the disclosed embodiment, following establishment of the mobile router to proxy home agent IP tunnel 20a, the routing resource 30 in the mobile ad hoc router 12h is configured for assigning the default mobile ad hoc network route via the attachment router address "3::32" 56 as the default route for any packet where the destination has an undetermined presence; in other words, the routing resource 30 sets the default route to the attachment router via the attachment address 56 used by the mobile ad hoc resource 32, distinct from the mobile IP tunnel 20a. Hence, the mobile ad hoc router 12h sends the packet toward the clusterhead according to the mobile ad hoc network protocol, enabling any attachment router (e.g., 12c) between the mobile ad hoc router 12h and the clusterhead 12a to determine whether the destination is attached to the corresponding attachment router. Hence, the packet is output without the necessity of the first mobile IP tunnel 20a.

In addition, the mobile ad hoc network resource 46 in the clusterhead 12a also is configured for responding to reception of any packet from within the mobile ad hoc network 10, regardless of whether the packet is received via the mobile router to proxy home agent tunnel 20a (e.g., packet 64 of FIG. 1), or via a MANET link 68. Hence, even if the mobile IP proxy resource 50 is configured for decapsulating a received packet 64 of FIG. 1 having been received via the tunnel 20a, the mobile IP proxy resource 50 first passes the decapsulated packet 64 to the MANET resource 46 to determine whether the destination address specified for the received packet 64 is reachable via the MANET 10.

Figure 4:
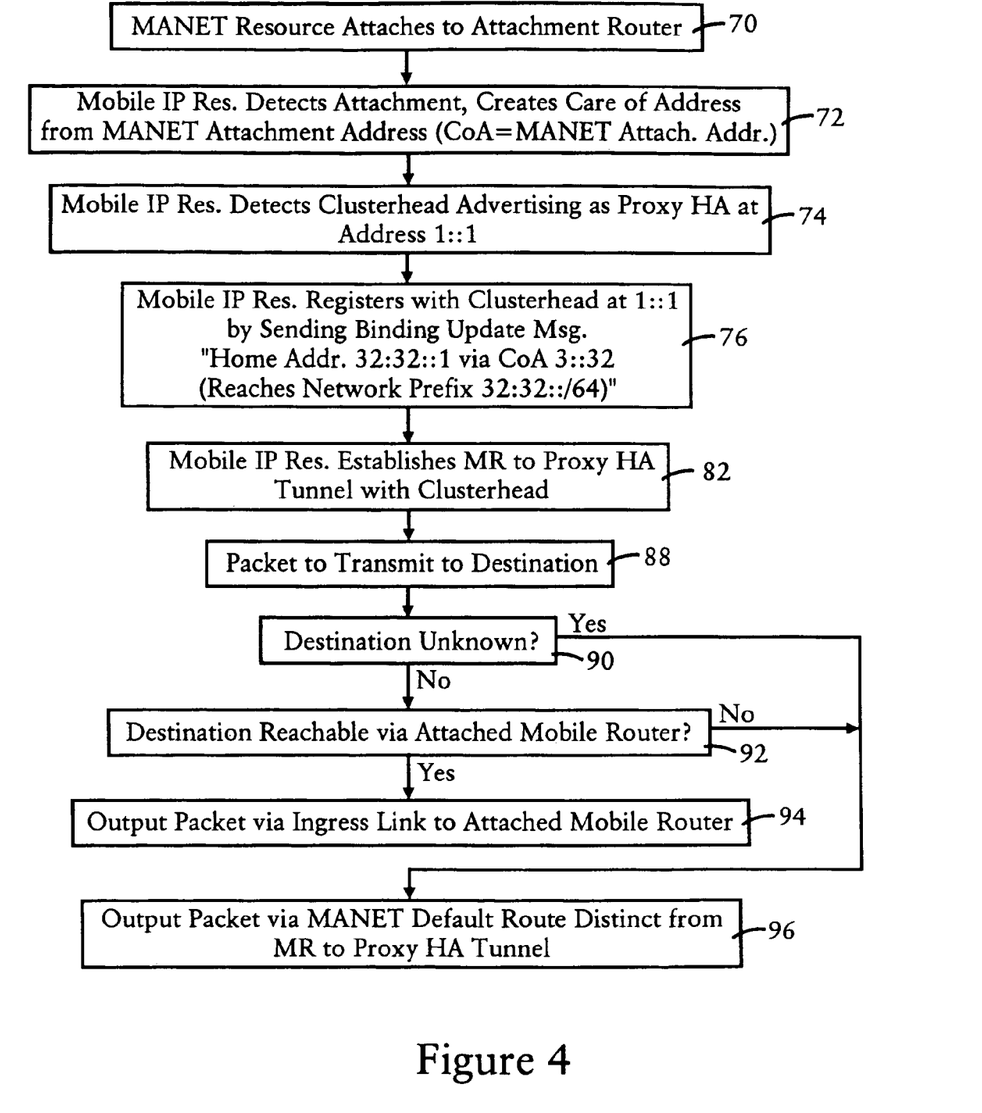
FIG. 4 is a diagram illustrating a method by one of the mobile ad hoc routers of registering with the clusterhead and establishing a mobile router to proxy home agent tunnel according to a prescribed mobile IP protocol, and outputting a packet destined for a destination node, according to an embodiment of the present invention.
Figure 5:
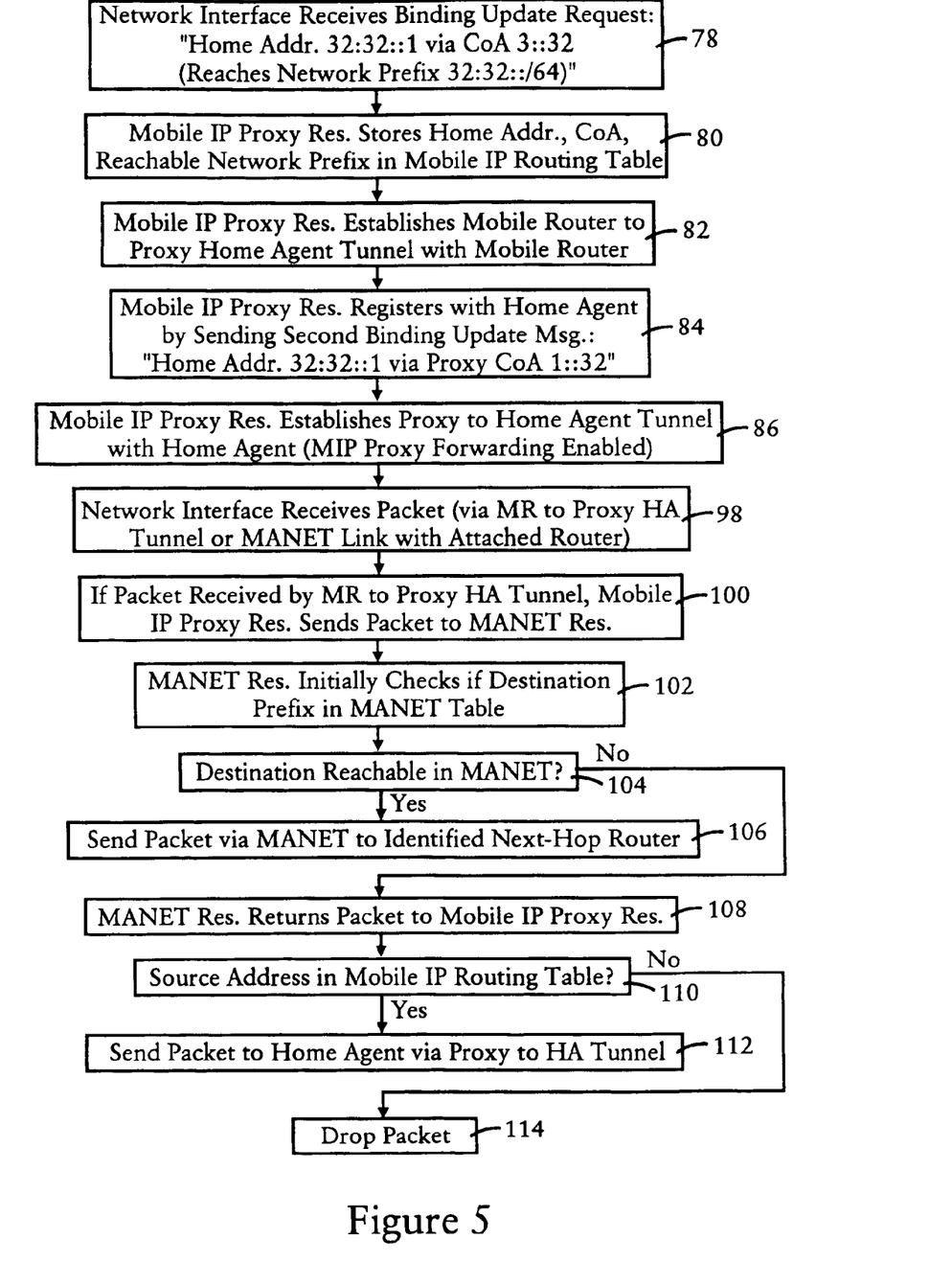
FIG. 5 is a diagram illustrating a method by the clusterhead of registering a mobile ad hoc router with a corresponding home agent, and routing packets received from within the mobile ad hoc network, according to an embodiment of the present invention.

FIGS. 4 and 5 are diagrams summarizing the respective methods by the mobile ad hoc router 12h and the clusterhead 12a in establishing a mobile IP tunnel 20 for selective forwarding of packets to the mobile ad hoc network 10 or the home agent 14, according to an embodiment of the present invention. The steps described in FIGS. 4 and 5 can be implemented as executable code stored on a computer readable medium (e.g., a hard disk drive, a floppy drive, a random access memory, a read only memory, an EPROM, a compact disk, etc.).

The method begins in step 70, where the MANET resource 32 of the mobile ad hoc router 12h attaches to the attachment router 12c based on choosing an attachment address "3::32" 56. In response to detecting attachment, the mobile IP resource 34 of the attached mobile ad hoc router 12h creates in step 72 a care of address 56 that equals the attachment address 56, and determines in step 74 that the clusterhead 12a also advertises itself as a proxy home agent at the proxy home agent address "1::1" 66. In response to detecting and storing the proxy home agent address 66, the mobile IP resource 34 registers in step 76 with the clusterhead 12a by sending a binding update request to the identified clusterhead 12a. The binding update request specifies the home address "32:32::1" 54 of the mobile ad hoc router 12h, the corresponding care of address "3::32" 56 for reaching the mobile ad hoc router 12h within the ad hoc network 10, and at least one mobile network prefix "32:32::/64" 58 delegated to the mobile router 12h.

Referring to FIG. 5, the ingress network interface 42 of the clusterhead 12a receives in step 78 the binding update request specifying the home address 54, the local care of address and 56, and the network prefix 58. The mobile IP proxy resource 50 responds to the binding update request by storing in step 80 the home address 54, the local care of address 56, and the reachable network prefixes 58 into the mobile IP routing table 52. The mobile IP proxy resource 50 in the clusterhead 12a and the mobile IP resource 34 in the mobile ad hoc router 12h establish in step 82 of FIGS. 4 and 5 the mobile router to proxy home agent tunnel 20a, enabling the clusterhead 12a to operate as a proxy home agent on behalf of the primary home agent 14.

Referring to FIG. 5, the mobile IP proxy resource 50 within the clusterhead 12a sends in step 84 a second binding update request to the identified home agent 14 of the mobile ad hoc router 12h; as recognized in the art, the home agent 14 can be identified by a numerous techniques, including explicitly identifying the home agent address 60 in the binding update request output by the mobile IP resource 34, or based on the mobile IP proxy resource 50 outputting a Home Agent Address Discovery Request message as described in the above-incorporated U.S. Patent Publication No. US 2004/0057440, or RFC 3963, or as described in the Internet Draft "Global HA to HA protocol". The second binding update message output by the mobile IP proxy resource 50 to the identified home agent 14 (i.e., the destination address field specifies the home agent address "32::1" 60) via the wide area network 22 specifies the home address 54 of the mobile ad hoc router 12h, the proxy care of address "1::32" 62 owned by the clusterhead 12a (i.e., within the default address prefix "1::/64") assigned to the clusterhead 12a, and optionally the home prefix 58.

In response to receiving an acknowledgment from the home agent 14, the mobile IP proxy resource 50 establishes in step 86 the proxy to home agent tunnel 20b with the home agent 14, enabling mobile IP proxy resource 50 to be enabled as a MIP proxy in the mobile router 12a, in accordance with the Internet Draft "Global HA to HA protocol".

Hence, the mobile router 12a needs to determine whether a packet received from the mobile router 12h, either via the mobile router to proxy home agent tunnel 20a or the MANET link 68, should be output back into the mobile ad hoc network 10, or forwarded via the proxy to home agent tunnel 20b to the home agent 14.

According to the disclosed embodiment, the routing resource 30 of the mobile ad hoc router 12h is configured for sending nonencapsulated packets via a MANET link 68, even if the destination for the packet is known by the routing resource 30 to be reachable via the Internet 22. In particular, if in step 88 of FIG. 4 the routing resource 30 has a packet to transmit and the destination of the packet is known in step 90, and if in step 92 the destination is reachable via an attached mobile router (not shown) in the tree-based MANET topology 10, the routing resource 30 outputs the packet 64 via the corresponding ingress link in step 94 to the identified attached mobile router having advertised the reachability to the destination. If, however, the destination is unknown in step 90, or the routing resource 30 determines (e.g., from an internal MANET routing table) that the destination is reachable via the mobile ad hoc network 10 via the attachment router in step 92, the routing resource 30 of the mobile ad hoc router 12h sends the packet via the default route to the attachment router 12c in step 96, namely via the MANET link 68 that is distinct from the tunnel 20a. As apparent from the foregoing, if the attachment router 12c has no routing information for reaching the destination specified in the packet, the attachment router 12c forwards the packet via its default route using the MANET link 68 toward the clusterhead 12a.

Referring to FIG. 5, the ingress interface 42 of the clusterhead 12a receives in step 98 the packet from the mobile ad hoc router 12h, either via the tunnel 20a or the MANET link 68. As described above with respect to FIG. 4, preferably each attached ad hoc mobile router (e.g., 12b, 12c, 12d, 12e, 12f, 12g, and 12h) sends each packet according to MANET protocol via a MANET link 68, distinct from any mobile IP tunnel (e.g., 20a).

However, even if the MANET network 10 includes a mobile ad hoc router that is not configured for sending packets via a MANET link 68 as preferred, but rather sends packets via its mobile router to proxy home agent tunnel (e.g., 20a), the clusterhead 12a is configured for sending packets received from a mobile IP tunnel (e.g., 20a) back into the MANET network 10 via a MANET link 68 as appropriate, bypassing the proxy to home agent tunnel 20b. Hence, the clusterhead 12a provides compatibility with any mobile routers that send packets via their mobile router to proxy home agent tunnel 20a, instead of the MANET link 68, as preferred.

In particular, if in step 100 the encapsulated packet is received via the tunnel 20a, the mobile IP proxy resource 50 decapsulates the packet 64, and forwards the decapsulated packet to the MANET resource 46. The MANET resource 46 initially checks in step 102 if the MANET routing table 48 includes a prefix 18 that encompasses the destination address specified in the received packet, indicating that the destination for the packet is reachable via the mobile ad hoc network 10.

If the MANET resource 46 determines in step 104 that the destination is reachable via the MANET network 10 based on identifying a matching address prefix 18 in the routing table 48, the MANET resource 46 sends in step 106 the packet to the identified next hop router based on the corresponding next hop address 64, eliminating the necessity of forwarding the packet to the home agent 14 via the tunnel 20b. As described previously, the next hop router will specify routing information for reaching the destination prefix enabling delivery of the packet within the MANET network 10.

If, however, the destination of the packet in step 104 is determined by the MANET resource 46 to be unreachable within the MANET 10, the MANET resource 46 returns the packet in step 108 to the mobile IP proxy resource 50. Since the packet was not received via the tunnel 20a but from the MANET resource 46, the mobile IP proxy resource 50 is unable to apply the conventional technique of determining the relationship between the home agent 14 and the mobile router 12h based on the corresponding tunnel 20a. Hence, the mobile IP proxy resource 50 uses the source address of the received packet to locate the proxy binding entry in the mobile IP routing table 52 that identifies the home address 54 and the corresponding care-of address, and consequently the associated primary binding between the proxy resource 50 and the home agent 14. If the mobile IP proxy resource 50 determines in step 110 that the source address 54 for the packet is specified in the mobile IP routing table 52, the mobile IP proxy resource 50 sends in step 112 the packet to the home agent 14 via the tunnel 20b, based on identifying the home agent 14 from the source address 54. Hence, the mobile IP proxy resource 50 sends the packet via the tunnel 20b to ensure that the packet transmission is topologically correct (i.e., a packet having the source address "32:32::1" should originate from the home agent 14 within the address realm "32::/16"). However if the source address is not in the mobile IP routing table 52, the packet is dropped in step 114.

According to the disclosed embodiment, use of the second mobile IP tunnel between the clusterhead and the home agent is minimized by outputting the packet toward the destination, according to the mobile ad hoc routing protocol, based on determining the destination is reachable via the mobile ad hoc network. If the packet is not reachable within the mobile ad hoc network, the packet is forwarded via the second mobile IP tunnel to ensure packet transmission is topologically correct. Hence, the clusterhead minimizes the necessity for sending packets via the second mobile IP tunnel to the home agent of the source mobile ad hoc router, by minimizing use of the second mobile IP tunnel to instances where the destination is not reachable via the mobile ad hoc network routing table. In addition, the mobile ad hoc router that originates the packet minimizes use of the tunnel to avoid added overhead in the mobile ad hoc network.

While the disclosed embodiment has been described in connection with what is presently considered to be the most practical and preferred embodiment, it is to be understood that the invention is not limited to the disclosed embodiments, but, on the contrary, is intended to cover zvarious modifications and equivalent arrangements included within the spirit and scope of the appended claims.

What is claimed is:

1. A method in a clusterhead of a mobile ad hoc network having established a tree topology according to a mobile ad hoc network protocol, the method comprising:

receiving a binding update request from a next hop mobile ad hoc router, the binding update request specifying, according to a prescribed mobile IP protocol, a home address of a mobile ad hoc router attached within the mobile ad hoc network and a corresponding care of address for reaching the mobile ad hoc router within the mobile ad hoc network;

storing, by a mobile IP proxy resource within the clusterhead, the home address and the corresponding care of address in a mobile IP routing table within the clusterhead;

registering, by the mobile IP proxy resource, the mobile ad hoc router with an identified home agent of the mobile ad hoc router based on sending a second binding update request to the identified home agent specifying the corresponding home address is reachable via a second care of address owned by the clusterhead, and further based on initiating a proxy to home agent tunnel with the identified home agent according to the prescribed mobile IP protocol;

responding to a packet received from within the mobile ad hoc network, and that specifies a source address field specifying the home address of the mobile ad hoc router and a destination address for a destination, by initially determining by a mobile ad hoc network resource whether the destination address is reachable within the mobile ad hoc network according to the mobile ad hoc network protocol based on accessing a mobile ad hoc network routing table within the clusterhead, the mobile ad hoc network routing table specifying, for each specified address prefix assigned within the mobile ad hoc network, one of a plurality of the next hop mobile ad hoc routers for reaching the corresponding address prefix within the mobile ad hoc network; and if the destination address is determined as reachable within the mobile ad hoc network, outputting the packet by the mobile ad hoc network resource to the one next hop mobile ad hoc router identified in the mobile ad hoc network routing table as reaching the address prefix containing the destination address;

if the destination address is not determined as reachable within the mobile ad hoc network, selectively outputting, by the mobile IP proxy resource, the packet to the home agent via the proxy to home agent tunnel in response to identifying the home agent from the mobile IP routing table based on the home address specified in the source address field.

2. The method of claim 1, further comprising receiving the packet according to the mobile ad hoc network protocol from the next hop mobile ad hoc router having supplied the binding update request.

3. The method of claim 1, further comprising establishing a mobile router to proxy home agent tunnel with the mobile ad hoc router in response to storing the corresponding home address and care of address in the mobile IP routing table.

4. The method of claim 3, further comprising receiving the packet according to the mobile ad hoc network protocol from the next hop mobile ad hoc router having supplied the binding update request, distinct from the mobile router to proxy home agent tunnel.

5. The method of claim 3, further comprising receiving the packet from the mobile ad hoc router via the mobile router to proxy home agent tunnel.

6. A method in a mobile ad hoc router, the method comprising:

attaching to an attachment router according to a mobile ad hoc network protocol that requires formation of a mobile ad hoc network according to a tree topology, the mobile ad hoc network having an identified clusterhead;

creating a care of address based on attachment to the attachment router;

registering with the clusterhead based on sending a binding update message to the clusterhead, via the attachment router, according to a mobile IP protocol, and establishing a first mobile IP tunnel with the clusterhead according to the mobile IP protocol; and sending a packet to a destination, based on outputting the packet via a default mobile ad hoc network route via the attachment router toward the clusterhead and according to the mobile ad hoc network protocol, distinct from the first mobile IP tunnel with the clusterhead.

7. The method of claim 6, wherein the registering includes specifying within the binding update message a plurality of mobile network prefixes that are reachable by the mobile ad hoc router according to the mobile IP protocol.

8. The method of claim 7, wherein the sending includes selecting the default mobile ad hoc network route based on a determined absence of any destination address for the destination in any internal routing tables in the mobile ad hoc router.

9. A clusterhead for a mobile ad hoc network formed according to a mobile ad hoc network protocol requiring formation of the mobile ad hoc network according to a tree topology, the clusterhead comprising:

a network interface configured for receiving a binding update request from a next hop mobile ad hoc router, the binding update request specifying, according to a prescribed mobile IP protocol, a home address of a second mobile ad hoc router attached within the mobile ad hoc network and a corresponding care of address for reaching the second mobile ad hoc router within the mobile ad hoc network;

a mobile IP routing table configured for storing the home address and the corresponding care of address of the second mobile ad hoc router;

a mobile IP proxy resource configured for parsing the binding update message and in response storing the corresponding home address and care of address of the second mobile ad hoc router into the mobile IP routing table, the mobile IP proxy resource further configured for sending, according to the prescribed mobile IP protocol, a second binding update request to an identified home agent specifying the home address of the second mobile ad hoc router is reachable via a second care of address owned by the clusterhead, the mobile IP proxy resource further configured for storing an identifier for the identified home agent in the mobile IP routing table and initiating a proxy to a home agent tunnel with the identified home agent according to the prescribed mobile IP protocol;

a mobile ad hoc network routing table configured for storing specified address prefixes assigned within the mobile ad hoc network, the mobile ad hoc network routing table specifying, for each specified address prefix assigned within the mobile ad hoc network, one of a plurality of the next hop mobile ad hoc routers for reaching the corresponding address prefix within the mobile ad hoc network;

a mobile ad hoc network resource configured for responding to reception of a packet from within the mobile ad hoc network, and that specifies a source address field specifying the home address of the second mobile ad hoc router and a destination address for a destination, by initially determining whether the destination address is reachable within the mobile ad hoc network according to the mobile ad hoc network protocol based on determining whether the destination address is within one of the specified address prefixes stored in the mobile ad hoc network routing table, wherein:

if the destination address is determined by the mobile ad hoc network resource as reachable within the mobile ad hoc network, the mobile ad hoc network resource is configured for outputting the packet to the one next hop mobile ad hoc router identified in the mobile ad hoc network routing table as reaching the address prefix containing the destination address;

if the destination address is not determined as reachable within the mobile ad hoc network, the mobile IP proxy resource is configured for selectively outputting the packet to the home agent via the proxy to home agent tunnel in response to identifying the home agent from the mobile IP routing table, based on the home address specified in the source address field.

10. The clusterhead of claim 9, wherein the network interface is configured for receiving the packet according to the mobile ad hoc network protocol from the next hop mobile ad hoc router having supplied the binding update request.

11. The clusterhead of claim 9, wherein the mobile IP proxy resource is configured for establishing a mobile router to proxy home agent tunnel with the second mobile ad hoc router in response to storing the corresponding home address and care of address in the mobile IP routing table.

12. The clusterhead of claim 11, wherein the network interface is configured for receiving the packet according to the mobile ad hoc network protocol from the next hop mobile ad hoc router having supplied the binding update request, distinct from the mobile router to proxy home agent tunnel.

13. The clusterhead of claim 11, wherein the network interface is configured for receiving the packet from the second mobile ad hoc router via the mobile router to proxy home agent tunnel.

14. A mobile ad hoc router comprising:
a mobile ad hoc resource configured for attaching to an attachment router according to a mobile ad hoc network protocol that requires formation of a mobile ad hoc network according to a tree topology, the mobile ad hoc network having an identified clusterhead;
a mobile IP resource configured for creating a care of address based on attachment to the attachment router, and registering with the clusterhead based on sending a binding update message to the clusterhead, via the attachment router, according to a mobile IP protocol, and establishing a first mobile IP tunnel with the clusterhead according to the mobile IP protocol; and
a routing resource configured for assigning, as a default route, a default mobile ad hoc network route via the attachment router toward the clusterhead and according to the mobile ad hoc network protocol, distinct from the first mobile IP tunnel with the clusterhead, the routing resource configured for sending a packet to a destination via the default route.

15. The mobile ad hoc router of claim 14, wherein the mobile IP resource is configured for specifying within the binding update message a plurality of mobile network prefixes that are reachable by the mobile ad hoc router according to the mobile IP protocol.

16. The mobile ad hoc router of claim 15, wherein the routing resource is configured for selecting the default mobile ad hoc network route based on a determined absence of any destination address for the destination in any internal routing tables in the mobile ad hoc router.

17. A computer readable medium having stored thereon sequences of instructions for a clusterhead of a mobile ad hoc network, having established a tree topology according to a mobile ad hoc network protocol, to output a packet to a destination, the sequences of instructions including instructions for:
receiving a binding update request from a next hop mobile ad hoc router, the binding update request specifying, according to a prescribed mobile IP protocol, a home address of a mobile ad hoc router attached within the mobile ad hoc network and a corresponding care of address for reaching the mobile ad hoc router within the mobile ad hoc network;
storing, by a mobile IP proxy resource within the clusterhead, the home address and the corresponding care of address in a mobile IP routing table within the clusterhead;
registering, by the mobile IP proxy resource, the mobile ad hoc router with an identified home agent of the mobile ad hoc router based on sending a second binding update request to the identified home agent specifying the corresponding home address is reachable via a second care of address owned by the clusterhead, and further based on initiating a proxy to home agent tunnel with the identified home agent according to the prescribed mobile IP protocol;
responding to a packet received from within the mobile ad hoc network, and that specifies a source address field specifying the home address of the mobile ad hoc router and a destination address for a destination, by initially determining by a mobile ad hoc network resource whether the destination address is reachable within the mobile ad hoc network according to the mobile ad hoc network protocol based on accessing a mobile ad hoc network routing table within the clusterhead, the mobile ad hoc network routing table specifying, for each specified address prefix assigned within the mobile ad hoc network, one of a plurality of the next hop mobile ad hoc routers for reaching the corresponding address prefix within the mobile ad hoc network; and
if the destination address is determined as reachable within the mobile ad hoc network, outputting the packet by the mobile ad hoc network resource to the one next hop mobile ad hoc router identified in the mobile ad hoc network routing table as reaching the address prefix containing the destination address;
if the destination address is not determined as reachable within the mobile ad hoc network, selectively outputting, by the mobile IP proxy resource, the packet to the home agent via the proxy to home agent tunnel in response to identifying the home agent from the mobile IP routing table based on the home address specified in the source address field.

18. The medium of claim 17, further comprising instructions for receiving the packet according to the mobile ad hoc network protocol from the next hop mobile ad hoc router having supplied the binding update request.

19. The medium of claim 17, further comprising instructions for establishing a mobile router to proxy home agent tunnel with the mobile ad hoc router in response to storing the corresponding home address and care of address in the mobile IP routing table.

20. The medium of claim 19, further comprising instructions for receiving the packet according to the mobile ad hoc network protocol from the next hop mobile ad hoc router having supplied the binding update request, distinct from the mobile router to proxy home agent tunnel.

21. The medium of claim 19, further comprising instructions for receiving the packet from the mobile ad hoc router via the mobile router to proxy home agent tunnel.

22. A computer readable medium having stored thereon sequences of instructions for a mobile ad hoc router to output a packet in a mobile ad hoc network having established a tree topology according to a mobile ad hoc network protocol the sequences of instructions including instructions for:
attaching to an attachment router according to a mobile ad hoc network protocol that requires formation of a mobile ad hoc network according to a tree topology, the mobile ad hoc network having an identified clusterhead;

creating a care of address based on attachment to the attachment router;

registering with the clusterhead based on sending a binding update message to the clusterhead, via the attachment router, according to a mobile IP protocol, and establishing a first mobile IP tunnel with the clusterhead according to the mobile IP protocol; and sending a packet to a destination, based on outputting the packet via a default mobile ad hoc network route via the attachment router toward the clusterhead and according to the mobile ad hoc network protocol, distinct from the first mobile IP tunnel with the clusterhead.

23. The medium of claim 22, wherein the registering includes specifying within the binding update message a plurality of mobile network prefixes that are reachable by the mobile ad hoc router according to the mobile IP protocol.

24. The medium of claim 23, wherein the sending includes selecting the default mobile ad hoc network route based on a determined absence of any destination address for the destination in any internal routing tables in the mobile ad hoc router.

25. A clusterhead for a mobile ad hoc network formed according to a mobile ad hoc network protocol requiring formation of the mobile ad hoc network according to a tree topology, the clusterhead comprising:

means for receiving a binding update request from a next hop mobile ad hoc router, the binding update request specifying, according to a prescribed mobile IP protocol, a home address of a second mobile ad hoc router attached within the mobile ad hoc network and a corresponding care of address for reaching the second mobile ad hoc router within the mobile ad hoc network;

first storage means for storing the home address and the corresponding care of address of the second mobile ad hoc router;

proxy means for parsing the binding update message and in response storing the corresponding home address and care of address of the second mobile ad hoc router into the mobile IP routing table, the proxy means further configured for sending, according to the prescribed mobile IP protocol, a second binding update request to an identified home agent specifying the home address of the second mobile ad hoc router is reachable via a second care of address owned by the clusterhead, the proxy means further configured for storing an identifier for the identified home agent in the first storage means and initiating a proxy to a home agent tunnel with the identified home agent according to the prescribed mobile IP protocol;

second storage means configured for storing specified address prefixes assigned within the mobile ad hoc network, the second storage means specifying, for each specified address prefix assigned within the mobile ad hoc network, one of a plurality of the next hop mobile ad hoc routers for reaching the corresponding address prefix within the mobile ad hoc network;

routing means for responding to reception of a packet from within the mobile ad hoc network, and that specifies a source address field specifying the home address of the second mobile ad hoc router and a destination address for a destination, by initially determining whether the destination address is reachable within the mobile ad hoc network according to the mobile ad hoc network protocol based on determining whether the destination address is within one of the specified address prefixes stored in the second storage means, wherein:

if the destination address is determined by the routing means as reachable within the mobile ad hoc network, the routing means is configured for outputting the packet to the one next hop mobile ad hoc router identified in the second storage as reaching the address prefix containing the destination address;

if the destination address is not determined as reachable within the mobile ad hoc network, the proxy means is configured for selectively outputting the packet to the home agent via the proxy to home agent tunnel in response to identifying the home agent from the first storage means based on the home address specified in the source address field.

26. A mobile ad hoc router comprising:

means for attaching to an attachment router according to a mobile ad hoc network protocol that requires formation of a mobile ad hoc network according to a tree topology, the mobile ad hoc network having an identified clusterhead;

means for creating a care of address based on attachment to the attachment router, and registering with the clusterhead based on sending a binding update message to the clusterhead, via the attachment router, according to a mobile IP protocol, and establishing a first mobile IP tunnel with the clusterhead according to the mobile IP protocol; and means for assigning, as a default route, a default mobile ad hoc network route via the attachment router toward the clusterhead and according to the mobile ad hoc network protocol, distinct from the first mobile IP tunnel with the clusterhead, the means for assigning configured for sending a packet to a destination via the default route.

27. A mobile ad hoc network having established a tree topology according to a mobile ad hoc network protocol, the mobile ad hoc network comprising:

a clusterhead at a root of the tree topology;

a next hop mobile router attached to the clusterhead; and a second mobile ad hoc router attached within the mobile ad hoc network, wherein:

the clusterhead comprises:

(1) a network interface configured for receiving a binding update request from the next hop mobile ad hoc router, the binding update request specifying, according to a prescribed mobile IP protocol, a home address of the second mobile ad hoc router a corresponding care of address for reaching the second mobile ad hoc router within the mobile ad hoc network, (2) a mobile IP routing table configured for storing the home address and the corresponding care of address of the second mobile ad hoc router, (3) a mobile IP proxy resource configured for parsing the binding update message and in response storing the corresponding home address and care of address of the second mobile ad hoc router into the mobile IP routing table, the mobile IP proxy resource further configured for sending, according to the prescribed mobile IP protocol, a second binding update request to an identified home agent specifying the home address of the second mobile ad hoc router is reachable via a second care of address owned by the clusterhead, the mobile IP proxy resource further configured for storing an identifier for the identified home agent in the mobile IP routing table and initiating a proxy to a home agent tunnel with the identified home agent according to the prescribed mobile IP protocol, (4) a mobile ad hoc network routing table configured for storing specified address prefixes assigned within the mobile ad hoc network, the mobile ad hoc network routing table specifying, for each specified address prefix assigned within the mobile ad hoc network, one of a plurality of the next hop mobile ad hoc routers for reaching the corresponding address prefix within the mobile ad hoc network, (5) a mobile ad hoc network resource configured for responding to reception of a packet from within the mobile ad hoc network, and that specifies a source address field specifying the home address of the second mobile ad hoc router and a destination address for a destination, by initially determining whether the destination address is reachable within the mobile ad hoc network according to the mobile ad hoc network protocol based on determining whether the destination address is within one of the specified address prefixes stored in the mobile ad hoc network routing table;

further wherein:

if the destination address is determined by the mobile ad hoc network resource as reachable within the mobile ad hoc network, the mobile ad hoc network resource is configured for outputting the packet to the one next hop mobile ad hoc router identified in the mobile ad hoc network routing table as reaching the address prefix containing the destination address;

if the destination address is not determined as reachable within the mobile ad hoc network, the mobile IP proxy resource is configured for selectively outputting the packet to the home agent via the proxy to home agent tunnel in response to identifying the home agent from the mobile IP routing table, based on the home address specified in the source address field.

28. The network of claim 27, wherein the mobile IP proxy resource is configured for establishing a mobile router to proxy home agent tunnel with the second mobile ad hoc router in response to storing the corresponding home address and care of address in the mobile IP routing table.

29. The network of claim 28, wherein the second mobile router is configured for outputting the packet, following establishment of the mobile router to proxy home agent tunnel, via a default path according to the mobile ad hoc network protocol and distinct from the mobile router to proxy home agent tunnel.

30. The network of claim 28, wherein the second mobile router is configured for outputting the packet to the clusterhead via the mobile router to proxy home agent tunnel.

* * * * *